(12) United States Patent
Sakai et al.

(10) Patent No.: US 11,133,506 B2
(45) Date of Patent: Sep. 28, 2021

(54) BINDER COMPOSITION, ELECTRODE MIXTURE, ELECTRODE, AND NON-AQUEOUS ELECTROLYTE SECONDARY BATTERY

(71) Applicant: Kureha Corporation, Tokyo (JP)

(72) Inventors: Yuki Sakai, Chuo-ku (JP); Shintarou Kamata, Chuo-ku (JP); Emi Sugawara, Chuo-ku (JP)

(73) Assignee: KUREHA CORPORATION, Tokyo (JP)

( * ) Notice: Subject to any disclaimer, the term of this patent is extended or adjusted under 35 U.S.C. 154(b) by 88 days.

(21) Appl. No.: 16/305,449

(22) PCT Filed: May 18, 2017

(86) PCT No.: PCT/JP2017/018694
§ 371 (c)(1),
(2) Date: Nov. 29, 2018

(87) PCT Pub. No.: WO2018/008263
PCT Pub. Date: Jan. 11, 2018

(65) Prior Publication Data
US 2020/0235400 A1   Jul. 23, 2020

(30) Foreign Application Priority Data
Jul. 6, 2016 (JP) .............................. JP2016-134557

(51) Int. Cl.
| H01M 4/62 | (2006.01) |
| H01M 4/66 | (2006.01) |
| C09J 7/38 | (2018.01) |
| C08F 214/22 | (2006.01) |
| C08L 27/16 | (2006.01) |
| H01M 10/0565 | (2010.01) |

(52) U.S. Cl.
CPC ........... *H01M 4/623* (2013.01); *C08F 214/22* (2013.01); *C08L 27/16* (2013.01); *C09J 7/385* (2018.01); *H01M 4/667* (2013.01); *H01M 10/0565* (2013.01)

(58) Field of Classification Search
CPC ....... H01M 4/62; H01M 4/66; H01M 10/0565
See application file for complete search history.

(56) References Cited

U.S. PATENT DOCUMENTS

| 6,077,624 A * | 6/2000 | Mitchell | ............. | H01M 2/1653 |
| | | | | 429/212 |
| 2010/0133482 A1 | 6/2010 | Abusleme et al. | | |
| 2011/0319567 A1 | 12/2011 | Noguchi et al. | | |
| 2013/0273424 A1 | 10/2013 | Watanabe et al. | | |
| 2013/0316234 A1 | 11/2013 | Momose et al. | | |
| 2014/0120269 A1 | 5/2014 | Abusleme et al. | | |
| 2015/0179996 A1 | 6/2015 | Inaba et al. | | |

FOREIGN PATENT DOCUMENTS

| CN | 100365853 C | 1/2008 |
| CN | 102282183 A | 12/2011 |
| CN | 101679563 B | 1/2012 |
| CN | 103429628 A | 12/2013 |
| CN | 104272502 A | 1/2015 |
| CN | 103261247 B | 2/2016 |
| EP | 3 285 316 A1 | 2/2018 |
| JP | 2010525124 A | 7/2010 |
| JP | 2015-151414 A | 8/2015 |
| KR | 10-2010-0016468 A | 2/2010 |
| KR | 10-2013-0109185 A | 10/2013 |
| WO | 2008129041 A1 | 10/2008 |
| WO | WO 2010/082617 A1 | 7/2010 |
| WO | 2012090876 A1 | 7/2012 |
| WO | WO 2014-002937 A1 | 1/2014 |
| WO | WO 2016/092675 A1 | 5/2016 |

OTHER PUBLICATIONS

Translation of International Search Report of PCT/JP2017/018694 dated Aug. 15, 2017.
English translation of International Preliminary Report on Patentability and Written Opinion dated Jan. 17, 2019, in PCT/JP2017/018694 (Forms PCT/IB/338, PCT/IB/373, and PCT/ISA/237).
Office Action dated Jan. 28, 2020, in Japanese Patent Application No. 2018-525964.
Extended European Search Report dated Feb. 27, 2019, in European Patent Application No. 17823871.3.
Japanese Office Action and English translation dated Jun. 4, 2019, for Japanese Application No. 2018-525964.
Office Action dated Feb. 20, 2020, in Korean Patent Application No. 10-2018-7031000.
English translation of the International Search Report, dated Aug. 15, 2017, for International Application No. PCT/JP2017/018693.
Extended European Search Report, dated May 22, 2019, for European Application No. 17823870.5.
International Preliminary Report on Patentability and English translation of the Written Opinion of the International Searching Authority, dated Jan. 17, 2019, for International Application No. PCT/JP2017/018693.
Japanese Office Action, dated Jan. 28, 2020, for Japanese Application No. 2018-525963, with an English translation.
Japanese Office Action, dated Jun. 4, 2019, for Japanese Application No. 2018-525963, with an English translation.
Korean Office Action, dated Feb. 26, 2020, for Korean Application No. 10-2018-7031698, with an English translation.

(Continued)

*Primary Examiner* — Kenneth J Douyette
(74) *Attorney, Agent, or Firm* — Birch, Stewart, Kolasch & Birch, LLP

(57) ABSTRACT

Provided is a binder composition that exhibits sufficient adhesion and that achieves the excellent dispersibility of a conductive auxiliary agent. The binder composition according to an embodiment of the present invention is a binder composition containing a vinylidene fluoride copolymer composition containing vinylidene fluoride and an acrylic monomer; the acrylic monomer being at least one type selected from acrylic acid and methacrylic acid; and a ratio (Mn2/Mn1) of a number average molecular weight of the vinylidene fluoride copolymer composition after being adsorbed onto alumina (Mn2) to a number average molecular weight of the vinylidene fluoride copolymer composition before being adsorbed onto alumina (Mn1) being less than 2.

5 Claims, No Drawings

(56) References Cited

OTHER PUBLICATIONS

U.S. Office Action, dated Jul. 8, 2020, for U.S. Appl. No. 16/306,175.
Office Action dated Sep. 25, 2020, in Korean Patent Application No. 10-2018-7031000.
Office Action dated Nov. 4, 2020, in Japanese Patent Application No. 2018-525964.
Office Action dated Oct. 28, 2020, in Republic of Korea Patent Application No. 10-2018-7031698.
Office Action dated Dec. 21, 2020, in Chinese Patent Application No. 201780025756.3.
Xin et al., "Polymer Binders for High Capacity Electrode of Lithium-Ion Battery," Progress in Chemistry (Aug. 2013), vol. 25, No. 8, pp. 1401-1410 (Abstract).
Office Action dated Jun. 15, 2021, in Republic of Korea Patent Application No. 10-2021-7009115.
Office Action dated Jun. 7, 2021, in Chinese Patent Application No. 201780025756.3.
Office Action dated Jan. 15, 2021, in Chinese Patent Application No. 201780026128.7.
Office Action dated Jan. 26, 2021, in Republic of Korea Patent Application No. 10-2018-7031698.
Office Action dated Jul. 22, 2021 in Chinese Patent Application No. 201780026128.7.

\* cited by examiner

BINDER COMPOSITION, ELECTRODE MIXTURE, ELECTRODE, AND NON-AQUEOUS ELECTROLYTE SECONDARY BATTERY

TECHNICAL FIELD

The present invention relates to a binder composition, an electrode mixture, an electrode, and a non-aqueous electrolyte secondary battery.

BACKGROUND ART

In recent years, there has been remarkable development in electronic technology, and the functionality of miniature mobile devices has become increasingly advanced. There is a demand for the power supplies used in these devices to be smaller and lighter, i.e. higher energy density. Non-aqueous electrolyte secondary batteries such as lithium-ion secondary batteries are widely used as a battery having high energy density.

From the perspective of global environmental problems or energy conservation, non-aqueous electrolyte secondary batteries are used in hybrid automobiles combining a secondary battery and an engine, electric automobiles having a secondary battery as a power supply, and the like, and applications thereof are expanding.

The electrode for a non-aqueous electrolyte secondary battery has a structure including a current collector and an electrode mixture layer formed on the current collector. The electrode mixture layer is formed typically by coating an electrode mixture, which contains an electrode active material, a conductive auxiliary agent, and a binder composition, in the form of slurry in which the electrode mixture is dispersed in an appropriate solvent or dispersion medium, on the current collector, or by volatilizing the solvent or the dispersion medium. Compositions of vinylidene fluoride-based copolymer such as polyvinylidene fluoride (PVDF) have been primarily used as a binder composition (binding agent).

PVDF has excellent chemical resistance, weather resistance, and contamination resistance, as well as excellent electrochemical stability, mechanical properties, slurry characteristics, and the like. However, there is a problem in that the PVDF exhibits weak adhesion to a metal foil which is a current collector of a battery.

Therefore, vinylidene fluoride-based copolymer compositions have been developed as binder materials with enhanced adhesion (e.g. Patent Document 1 and Patent Document 2). Patent Document 1 discloses a binder for battery electrodes which contains a vinylidene fluoride-based copolymer composition having a polar group. Patent Document 2 discloses a vinylidene fluoride-based copolymer which is derived from a vinylidene fluoride monomer and a certain type of hydrophilic (meth)acrylic monomer (MA), the vinylidene fluoride-based copolymer including from 0.05 to 10 mol % of repeating units derived from hydrophilic (meth)acrylic monomer (MA), and a fraction of randomly distributed units (MA) being at least 40%.

CITATION LIST

Patent Literature

Patent Document 1: WO 2012/090876 (publication: Jul. 5, 2012)

Patent Document 2: WO 2008/129041 (publication: Oct. 30, 2008)

SUMMARY OF INVENTION

Technical Problem

However, with the binder composition including the vinylidene fluoride-based copolymer composition described in Patent Document 1 and the binder composition including the vinylidene fluoride-based copolymer described in Patent Document 2, the dispersibility of the conductive auxiliary agent included in the electrode mixture is not sufficient, and thus the problem of low electrical conductivity of the electrode mixture layer exists.

The present invention was completed in light of problems of technologies of the related art described above, and an object of the present invention is to provide a binder composition that uses a vinylidene fluoride copolymer composition to which a polar group is introduced, and that has the excellent dispersibility of a conductive auxiliary agent while sufficient adhesiveness is achieved.

Solution to Problem

According to the binder composition of an embodiment of the present invention, to solve the problem described above, the binder composition includes a vinylidene fluoride copolymer composition; the vinylidene fluoride copolymer composition includes a copolymer of vinylidene fluoride and an acrylic monomer; the acrylic monomer is at least one type selected from acrylic acid and methacrylic acid; and the vinylidene fluoride copolymer composition has, in a case where the vinylidene fluoride copolymer composition is adsorbed onto alumina, a ratio (Mn2/Mn1) of less than 2, the ratio of a number average molecular weight of the vinylidene fluoride copolymer composition that is not adsorbed onto the alumina after the adsorption (Mn2) to a number average molecular weight of the vinylidene fluoride copolymer composition before the adsorption (Mn1).

Advantageous Effects of Invention

According to the present invention, a binder composition that enhanced the dispersibility of a conductive auxiliary agent while sufficient adhesiveness is achieved is provided.

DESCRIPTION OF EMBODIMENTS

An embodiment of the binder composition, the electrode mixture, the electrode and the non-aqueous electrolyte secondary battery, and the production method of the binder composition according to the present invention are described below in detail.

Binder Composition

The binder composition according to the present embodiment is a composition for binding an electrode active material to a current collector in an electrode in which an electrode mixture layer containing the electrode active material is formed on the current collector. The binder composition according to the present embodiment contains a vinylidene fluoride copolymer composition. Note that the binder composition may contain a solvent besides the vinylidene fluoride copolymer composition. The solvent may be a non-aqueous solvent or water. Examples of the non-aqueous solvent include N-methylpyrrolidone, N,N-dimethylformamide, N,N-dimethylacetamide, dimethyl sulfoxide, hexamethylphosphoramide, dioxane, tetrahydrofuran, tetramethylurea, triethyl phosphate, trimethyl phosphate, acetone, cyclohexanone, and the like. Two or more types of these solvents may be mixed and used.

The vinylidene fluoride copolymer composition is described in detail below.

Vinylidene Fluoride Copolymer Composition

In the present embodiment, "vinylidene fluoride copolymer composition" refers to a composition including at least a copolymer of vinylidene fluoride and an acrylic monomer. Examples of the vinylidene fluoride copolymer composition include homopolymers of vinylidene fluoride, and the compositions including copolymers of vinylidene fluoride and an acrylic monomer. The acrylic monomer used in the copolymerization with the vinylidene fluoride is at least one type selected from acrylic acid and methacrylic acid, and is preferably acrylic acid. The acrylic monomer has a carboxy group and the carboxy group is a functional group that has adhesiveness to metal. Thus, even better adhesiveness to a metal foil, which is a current collector of a battery, of the binder composition is achieved. Note that the copolymer of the vinylidene fluoride and the acrylic monomer may further include another monomer in addition to the vinylidene fluoride and the acrylic monomer. Furthermore, the vinylidene fluoride copolymer composition may include a plurality of types of copolymers of an acrylic monomer and vinylidene fluoride, having different compositions.

Upon performing copolymerization of the vinylidene fluoride and the acrylic monomer, the total amount of the acrylic monomer to be used in the polymerization is not particularly limited; however, the total amount is preferably from 0.05 to 5 parts by mass, more preferably from 0.1 to 3 parts by mass, and even more preferably from 0.3 to 2 parts by mass, per 100 parts by mass of the vinylidene fluoride.

The vinylidene fluoride copolymer of the vinylidene fluoride and the acrylic monomer according to the present embodiment has preferably from 99.95 to 95 mol %, more preferably from 99.92 to 96.5 mol %, and particularly preferably from 99.9 to 98 mol % of constituent unit derived from the vinylidene fluoride (wherein the total of the constituent unit derived from the vinylidene fluoride and the constituent unit derived from the acrylic monomer is 100 mol %). Furthermore, the vinylidene fluoride copolymer of the vinylidene fluoride and the acrylic monomer according to the present embodiment preferably includes from 0.05 to 5 mol %, more preferably from 0.08 to 3.5 mol %, and particularly preferably from 0.1 to 2 mol % of the constituent unit derived from the acrylic monomer is included.

The inherent viscosity of the vinylidene fluoride copolymer composition according to the present embodiment is not particularly limited; however, the inherent viscosity is preferably from 1 dL/g to 5 dL/g, more preferably from 1.5 dL/g to 4 dL/g, and even more preferably from 1.6 dL/g to 3.5 dL/g. Furthermore, in an example, the inherent viscosity of the vinylidene fluoride copolymer composition is particularly preferably from 1.7 dL/g to 3.5 dL/g. When the inherent viscosity is 1 dL/g or greater, the even better adhesiveness of the binder composition is achieved. Furthermore, when the inherent viscosity is 5 dL/g or less, the decrease in the slurry solid content is further suppressed, and even better productivity is achieved.

Furthermore, the absorbance ratio $A_R$ of the vinylidene fluoride copolymer composition according to the present embodiment is not particularly limited but is preferably from 0.1 to 0.7, more preferably from 0.15 to 0.7, and particularly preferably from 0.2 to 0.7. Furthermore, in an example, the absorbance ratio $A_R$ of the vinylidene fluoride copolymer composition is preferably from 0.15 to 0.6 or from 0.2 to 0.5. In a case where the absorbance ratio is 0.1 or greater, the even better adhesiveness of the binder composition is achieved. Furthermore, in a case where the absorbance ratio is 0.7 or less, the reduction in crystallinity of the vinylidene fluoride copolymer composition can be suppressed. The absorbance ratio $A_R$ of the vinylidene fluoride copolymer composition can be calculated by, for example, the method described in Examples below.

Furthermore, the melting point of the vinylidene fluoride copolymer composition according to the present embodiment is preferably 160° C. or higher, and more preferably 165° C. or higher. The melting point of the vinylidene fluoride copolymer composition can be measured by, for example, the method described in Examples below. Note that, in the present invention, the "melting point" is determined by using a differential scanning calorimeter. Specifically, the vinylidene fluoride copolymer composition is heated to a temperature that is not lower than the equilibrium melting point of the polyvinylidene fluoride by a differential scanning calorimeter. Thereafter, the vinylidene fluoride copolymer composition is cooled to approximately room temperature to be solidified, and the peak top of the endothermic peak having the maximum area among endothermic peaks obtained upon increasing the temperature of the vinylidene fluoride copolymer composition is used as the melting point.

Other Monomers

Examples of other monomer that may be included in the copolymer of the vinylidene fluoride and the acrylic monomer include fluorine-based monomers and hydrocarbon-based monomers, such as ethylene and propylene, that are copolymerizable with vinylidene fluoride, and monomers that are copolymerizable with the acrylic monomer. Examples of fluorine-based monomers that are copolymerizable with vinylidene fluoride include vinyl fluoride, trifluoroethylene, tetrafluoroethylene, chlorotrifluoroethylene, hexafluoropropylene, and perfluoroalkyl vinyl ethers represented by perfluoromethyl vinyl ether. Examples of the monomer that is copolymerizable with the acrylic monomer include 2-hydroxyethyl(meth)acrylate, hydroxypropyl (meth)acrylate, (meth)acrylamide, glycidyl (meth)acrylate, and acrylonitrile. Note that one type of these other monomers may be used alone, or two or more types thereof may be used.

In a case where other monomer(s) is included in the copolymer of the vinylidene fluoride and the acrylic monomer, the total amount of such other monomer(s) to be used in the polymerization is not particularly limited; however, the total amount is preferably from 0.01 to 30 parts by mass, more preferably from 0.05 to 20 parts by mass, and even more preferably from 0.1 to 10 parts by mass, per 100 parts by mass of the vinylidene fluoride.

Number Average Molecular Weight Ratio

The number average molecular weight ratio in the vinylidene fluoride copolymer composition according to the present embodiment is described below.

The number average molecular weight ratio of the vinylidene fluoride copolymer composition is, when the vinylidene fluoride copolymer composition is adsorbed onto alumina, a ratio (Mn2/Mn1) of the number average molecular weight of the vinylidene fluoride copolymer composition that was not adsorbed onto the alumina after the adsorption of the vinylidene fluoride copolymer composition onto the alumina (Mn2) to the number average molecular weight of the vinylidene fluoride copolymer composition before the adsorption of the vinylidene fluoride copolymer composition onto the alumina (Mn1). The number average molecular weight ratio (Mn2/Mn1) of the vinylidene fluoride copolymer composition according to the present embodiment is less than 2. The number average molecular weight ratio (Mn2/Mn1) of the vinylidene fluoride copolymer composition according to the present embodiment is preferably 1.8 or less, more preferably 1.7 or less, and even more preferably 1.6 or less.

Note that, in a case where the vinylidene fluoride copolymer composition is adsorbed onto alumina, the copolymer of the acrylic monomer and the vinylidene fluoride is preferentially adsorbed onto the alumina among the polymers included in the vinylidene fluoride copolymer composition. That is, Mn2 is the number average molecular weight of the rest of the polymer that was not adsorbed onto the alumina. Examples of the rest of the polymer include the copolymer of the vinylidene fluoride and the acrylic monomer that was not adsorbed onto the alumina, and other polymers included in the vinylidene fluoride copolymer composition. Examples of such other polymers include homopolymers of the vinylidene fluoride and the like.

Mn2/Mn1 is an indicator for the distribution of polar functional group relative to the molecular weight distribution of the vinylidene fluoride copolymer composition. A larger Mn2/Mn1 indicates that the vinylidene fluoride copolymer having the polar group included in the vinylidene fluoride copolymer composition is distributed in the lower molecular weight region in a biased manner relative to the molecular weight distribution of the vinylidene fluoride copolymer composition.

It is conceived that the adsorption rate to the solid surface of the polymer is considered to be faster for a low molecular weight substance. Therefore, in a case where the polar functional group is distributed in the low molecular weight region in a biased manner in the vinylidene fluoride copolymer composition, the conductive auxiliary agent tends to aggregate due to the preferential adsorption of the vinylidene fluoride copolymer composition having the polar functional group onto the conductive auxiliary agent. The number average molecular weight ratio Mn2/Mn1 of the vinylidene fluoride copolymer composition according to the present embodiment is less than 2, and the dispersibility of the conductive auxiliary agent is enhanced due to the suppression of the biased distribution in the low molecular weight region of the vinylidene fluoride copolymer having the polar group derived from the acrylic monomer, in the molecular weight distribution of the vinylidene fluoride copolymer composition according to the present embodiment.

The number average molecular weight ratio in the vinylidene fluoride copolymer composition according to the present embodiment is estimated by the following method.

First, a 0.1% binder composition-NMP solution is prepared. While this solution is agitated, alumina (e.g. AKP 3000) is added gradually. After adding the alumina, the mixture is agitated for a certain time period and then allowed to stand still. The supernatant is subjected to centrifugal separation. The supernatant after the centrifugal separation and the 0.1% binder composition-NMP solution before the alumina addition are subjected to GPC analysis to calculate each of the molecular weights. The number average molecular weight of the vinylidene fluoride copolymer composition before being added to the alumina is used as Mn1, and the number average molecular weight of the vinylidene fluoride copolymer composition that was not adsorbed onto the alumina after being added to the alumina is used as Mn2, and the number average molecular weight ratio (Mn2/Mn1), which is the ratio of Mn2 to Mn1, is then determined. The amount of the alumina to be added also depends on the specific surface area of the alumina to be used and the like, cannot be restrictively decided, and is preferably adjusted to a degree where 60% or greater is adsorbed after the adsorption compared to the before the adsorption, i.e. the area of the chromatogram of the vinylidene fluoride copolymer composition after the adsorption is smaller by at least 60% compared to the area of the chromatogram of the vinylidene fluoride copolymer composition before the adsorption.

Furthermore, in general, the use of a high molecular weight binder composition can achieve high adhesiveness, and the suppression of the biased distribution of the polar group in the low molecular weight region contributes to the exhibition of efficient adhesiveness of the polar group. Because of this, the binder composition according to an embodiment of the present invention can achieve the effect of exhibiting the excellent dispersibility of the conductive auxiliary agent while sufficient adhesiveness is achieved.

Production Method of Binder Composition

The production method of the binder composition is not particularly limited but, in an example, includes performing polymerization including producing a vinylidene fluoride copolymer composition by subjecting vinylidene fluoride and an acrylic monomer to copolymerization.

The polymerization method of the vinylidene fluoride copolymer in the polymerizing step is not particularly limited, and a conventionally known polymerization method can be used. Examples of the polymerization method include suspension polymerization, emulsion polymerization, solution polymerization, and the like; however, among these, from the perspective of ease in post-treatment or the like, suspension polymerization in an aqueous system and emulsion polymerization are preferable, and suspension polymerization in an aqueous system is particularly preferable.

Suspension Polymerization

Suspension polymerization is a method of dissolving an oil-soluble polymerization initiator in a water-insoluble monomer in water containing a stabilizer or the like, suspending and dispersing the mixture by mechanical stirring, and heating the mixture to perform polymerization in the monomer droplets. In the suspension polymerization, the polymerization progresses in the monomer droplets, and thus a dispersed solution of binder composition fine particles can be obtained. In the suspension polymerization, a dispersion medium, a suspending agent, a polymerization initiator, and the like are used in addition to the monomer used for the polymerization of the vinylidene fluoride copolymer.

Dispersion Medium

The dispersion medium that can be used is not particularly limited, and a conventionally known dispersion medium can be used; however, water is preferable as the dispersion medium.

Suspending Agent

The suspending agent that can be used is not particularly limited, and a conventionally known suspending agent can be used. Examples of the suspending agent include methylcellulose, methoxylated methylcellulose, propoxylated methylcellulose, hydroxyethyl cellulose, hydroxypropyl cellulose, polyvinyl alcohol, polyethylene oxide, gelatin, and the like.

The added amount of the suspending agent is preferably from 0.005 to 1.0 part by mass, and more preferably from 0.01 to 0.4 parts by mass, per 100 parts by mass total of all the monomers used in the copolymerization.

Polymerization Initiator

The polymerization initiator that can be used is not particularly limited, and a conventionally known polymerization initiator can be used. Examples of polymerization initiator include diisopropyl peroxydicarbonate, dinormal propyl peroxydicarbonate, dinormal heptafluoropropyl peroxydicarbonate, isobutyl peroxide, di(chlorofluoroacyl)peroxide, di(perfluoroacyl)peroxide, t-butyl peroxypivalate, and the like.

The added amount of the polymerization initiator is preferably from 0.05 to 5 parts by mass, and more preferably from 0.15 to 2 parts by mass, per 100 parts by mass total of all the monomers used in the copolymerization.

Other Components

In the suspension polymerization, a chain transfer agent may be used to adjust the degree of polymerization of the obtained vinylidene fluoride copolymer. Examples of the chain transfer agent include ethyl acetate, methyl acetate, diethyl carbonate, acetone, ethanol, n-propanol, acetaldehyde, propylaldehyde, ethyl propionate, carbon tetrachloride, and the like.

When a chain transfer agent is used, the added amount of the chain transfer agent is preferably from 0.1 to 5 parts by mass, and more preferably from 0.5 to 3 parts by mass, per 100 parts by mass total of all the monomers used in the copolymerization.

Furthermore, a buffer solution may be used as necessary. The buffer solution that can be used is not particularly limited, and a conventionally known buffer solution can be used. Examples of the buffer solution include citrate buffer solutions, phosphate buffer solutions, citrate-phosphate buffer solutions, acetate buffer solutions, borate buffer solutions, tris buffer solutions, and the like. When a buffer solution is used, the amount of the buffer agent constituting the buffer solution is preferably from 0.01 to 5 parts by mass, and preferably from 0.1 to 3 parts by mass, per 100 parts by mass total of all the monomers used in the copolymerization.

Polymerization Condition

The polymerization temperature T is selected as appropriate according to the 10-hour half-life temperature $T_{10}$ of the polymerization initiator, and is normally selected in the range of $T_{10}-20°C. \leq T \leq T_{10}+20°C$. For example, $T_{10}$ of t-butyl peroxypivalate and diisopropyl peroxydicarbonate are 54.6° C. and 40.5° C., respectively (see product catalog of NOF Corporation). Therefore, in polymerization using t-butyl peroxypivalate or diisopropyl peroxydicarbonate as a polymerization initiator, the polymerization temperature T is selected as appropriate in the range of $34.6°C. \leq T \leq 74.6°C$. and $20.5°C. \leq T \leq 60.5°C$., respectively.

The polymerization is typically performed under increased pressure, and preferably from 3 to 15 MPa-G.

The polymerization time is not particularly limited, but not longer than 100 hours is preferred from the perspective of productivity.

Electrode Mixture

The electrode mixture according to the present embodiment contains the binder composition according to the present embodiment, an electrode active material, and a conductive auxiliary agent. Furthermore, to adjust the viscosity of the electrode mixture, as necessary, a solvent or a dispersion medium may be added as appropriate. An electrode can be produced by forming an electrode mixture layer by coating this electrode mixture onto a current collector.

Electrode Active Material

The electrode active material used in the electrode mixture of the present embodiment is not particularly limited and, for example, a conventionally known electrode active material for negative electrodes (negative electrode active material) or electrode active material for positive electrodes (positive electrode active material) can be used. Examples of the negative electrode active material include carbon materials, metal/alloy materials, metal oxides, and the like. Among these, carbon materials are preferable. When such a carbon material is used, even higher energy density of the battery can be achieved. A lithium-based positive electrode active material containing at least lithium is preferable as a positive electrode active material. Examples of lithium-based positive electrode active materials include composite metal chalcogen compounds represented by the general formula $LiMY_2$ (M is at least one type of transition metals such as Co, Ni, Fe, Mn, Cr, or V; and Y is a chalcogen element such as O or S) such as $LiCoO_2$ or $LiNi_xCo_{1-x}O_2$ ($0 \leq x \leq 1$), composite metal oxides having a spinel structure such as $LiMn_2O_4$, olivine-type lithium compounds such as $LiFePO_4$, and the like.

Conductive Auxiliary Agent

The conductive auxiliary agent used in the electrode mixture of the present embodiment is not particularly limited and, for example, conventionally known conductive auxiliary agents, such as carbon black, carbon fibers, and carbon nanotubes, can be used.

Other Components of Electrode Mixture

The electrode mixture of the present embodiment may contain another component besides the components described above. Examples of such another component include pigment dispersant such as polyvinylpyrrolidone, and the like.

Composition

In the electrode mixture according to the present embodiment, the binder composition is preferably contained in an amount of 0.1 to 10 parts by mass, and more preferably from 0.3 to 6 parts by mass, per 100 parts by mass total of the binder composition and the electrode active material. Furthermore, the electrode active material is preferably contained in an amount of 90 to 99.9 parts by mass, and more preferably from 94 to 99.7 parts by mass. The content of the conductive auxiliary agent is preferably from 0.1 to 10 parts by mass, more preferably from 0.3 to 5 parts by mass, and even more preferably from 0.5 to 3 parts by mass, per 100 parts by mass total of the binder composition, the electrode active material, and the conductive auxiliary agent.

Production Method of Electrode Mixture

The production method of the electrode mixture according to the present embodiment needs to mix the binder composition, the electrode active material, and the conductive auxiliary agent to form a uniform slurry, and the order of the mixing is not particularly limited. Furthermore, when the binder composition contains a solvent, the electrode active material or the like may be added before the solvent is added to the vinylidene fluoride copolymer composition.

For example, the electrode active material and the solvent may be added to the vinylidene fluoride copolymer composition and agitated and mixed to obtain the electrode mixture. Furthermore, the electrode active material may be dispersed in the solvent, and then the binder composition may be added thereto and agitated and mixed to obtain the electrode mixture.

Electrode

The electrode according to the present embodiment has a structure in which a layer formed from the electrode mixture according to the present embodiment is provided on a current collector. The electrode mixture layer needs to be formed on at least one face of the current collector and is preferably formed on the both faces of the current collector.

Current Collector

The current collector is a base material of an electrode and a terminal to take electricity out. The material of the current collector is not particularly limited, and a conventionally known material, such as aluminum or copper, can be used.

The thickness of the current collector is not particularly limited and is preferably from 5 to 100 μm, and more preferably from 5 to 20 μm.

Electrode Mixture Layer

The electrode mixture layer is a layer obtained by coating and drying the electrode mixture described above onto the current collector. The coating method of the electrode mixture is not particularly limited, and examples thereof include methods of coating by using a bar coater, a die coater, or a comma coater, and the like.

The thickness of the electrode mixture layer is not particularly limited but is typically from 20 to 250 μm, and preferably from 20 to 150 μm. Furthermore, the coating weight of the electrode mixture layer is not particularly limited but is typically from 20 to 700 $g/m^2$, and preferably from 30 to 500 $g/m^2$.

The drying temperature and the drying time to form the electrode mixture layer are typically at a temperature of 50 to 150° C. for 1 to 300 minutes. The pressure at the time of drying is not particularly limited but drying is ordinarily performed under atmospheric pressure or reduced pressure.

Furthermore, press treatment may be performed. In the case where the press treatment is performed, the pressure is typically from 1 to 200 MPa-G.

Non-Aqueous Electrolyte Secondary Battery

The non-aqueous electrolyte secondary battery according to the present embodiment has the electrode according to the present embodiment. The non-aqueous electrolyte secondary battery according to the present embodiment may include a polymer battery containing a gel electrolyte and the like. Other components (e.g. separator) in the non-aqueous electrolyte secondary battery are not particularly limited, and conventionally used components may be used.

SUMMARY

According to the binder composition of an embodiment of the present invention, the binder composition contains a vinylidene fluoride copolymer composition; the vinylidene fluoride copolymer composition contains a copolymer of vinylidene fluoride and an acrylic monomer; the acrylic monomer is at least one type selected from acrylic acid and methacrylic acid; and the vinylidene fluoride copolymer composition has, in the case where the vinylidene fluoride copolymer composition is adsorbed onto alumina, a ratio (Mn2/Mn1) if less than 2, the ratio of a number average molecular weight of the vinylidene fluoride copolymer composition that is not adsorbed onto the alumina after the adsorption (Mn2) to a number average molecular weight of the vinylidene fluoride copolymer composition before the adsorption (Mn1).

Furthermore, in the binder composition of an embodiment of the present invention, the melting point of the vinylidene fluoride copolymer composition described above may be preferably 160° C. or higher.

Furthermore, an electrode mixture containing the binder composition of an embodiment of the present invention, an electrode active material, and a conductive auxiliary agent is also included in the present invention.

Furthermore, an electrode in which a layer formed from the electrode mixture according to an embodiment of the present invention is provided on a current collector, and a non-aqueous electrolyte secondary battery having the electrode are also included in the present invention.

Embodiments of the present invention will be described in further detail hereinafter using examples. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents disclosed in the present specification are hereby incorporated by reference.

EXAMPLES

As described below, electrodes were produced by using various binder compositions according to embodiments of the present invention, and a peeling test and volume resistivity measurement were performed by using these. Note that, before examples are specifically described, the calculation methods of "inherent viscosity" and "absorbance ratio" in the present specification are described below.

Inherent Viscosity $\eta_i$

To calculate the inherent viscosity $\eta_i$, 80 mg of vinylidene fluoride copolymer composition is dissolved in 20 mL of N,N-dimethylformamide to prepare a polymer solution. The viscosity η of this polymer solution is measured by using an Ubbelohde viscometer in a thermostatic chamber at 30° C. The inherent viscosity $\eta_i$ is determined by the following equation by using the viscosity η.

$$\eta_i = (1/C) \cdot \ln(\eta/\eta_0)$$

In the equation above, $\eta_0$ is the viscosity of the N,N-dimethylformamide, which is the solvent, and C is 0.4 g/dL.

Absorbance Ratio $A_R$

To calculate the absorbance ratio $A_R$, a vinylidene fluoride copolymer composition is heat-pressed at 230° C. to prepare a 30 mm×30 mm pressed sheet. The IR spectrum of the prepared pressed sheet is analyzed in the range from 1500 $cm^{-1}$ to 4000 $cm^{-1}$ by using the infrared spectrophotometer FT-730 (available from Horiba, Ltd.). The absorbance ratio $A_R$ is determined by the following equation.

$$A_R = A_{1700-1800}/A_{3023}$$

In the equation above, $A_{1700-1800}$ is the absorbance originating from stretching vibration of carbonyl groups detected in the range of 1700 to 1800 $cm^{-1}$, and $A_{3023}$ is the absorbance originating from stretching vibration of CH detected near 3023 $cm^{-1}$.

Example 1

Preparation of Binder Composition

In an autoclave having a capacity of 2 L, 930 g of ion-exchanged water as a dispersion medium, 0.2 g of Metolose SM-100 (available from Shin-Etsu Chemical Co., Ltd.) as a cellulose-based suspending agent, 3.2 g of a 50 wt. % t-diisopropyl peroxydicarbonate-HCFC-225cb solution as a polymerization initiator, 400 g of vinylidene fluoride, and 0.2 g of acrylic acid as a monomer were charged, and the temperature thereof was increased to 26° C. over 1 hour. Thereafter, while the temperature of 26° C. was maintained, 98 g of 2 wt. % acrylic acid aqueous solution was added over 9 hours. At the time when 25.7 hours was passed from the start of the temperature increase, the polymerization was terminated.

After the polymerization was terminated, the polymer slurry was heat-treated at 95° C. for 60 minutes. The polymer slurry was then filtered and dehydrated, washed with water, and dried at 80° C. for 20 hours to obtain a binder composition (vinylidene fluoride copolymer composition). The yield of the obtained polymer was 96%, the inherent viscosity $\eta_i$ was 3.04 dL/g, and the absorbance ratio $A_R$ was 0.28.

Production of Electrode Mixture

In a cup made from polyethylene, the binder composition, N-methyl-2-pyrrolidone (NMP), and ketjen black (Carbon ECP, available from Lion Specialty Chemicals Co., Ltd.) as a conductive auxiliary agent were added and mixed by AR-310, available from Thinky Corporation, (1500 rpm, 1 minute) to allow the mixture to be a paste. To this, an electrode active material (lithium cobaltate, CELLSEED C5H, available from Nippon Chemical Industrial Co., Ltd.) and, as necessary, NMP were added and mixed (1500 rpm, 2 minutes). Furthermore, NMP was added to adjust the viscosity to a viscosity that enables coating and mixed (1500 rpm, 2 minutes) to prepare an electrode mixture (mixing A).

Note that the added amount (part) of the binder composition was 1.5 parts per 100 parts of the electrode active material. Furthermore, the added amount (part) of the conductive auxiliary agent was 0.5 parts per 100 parts of the electrode active material. That is, the ratio of electrode active material/conductive auxiliary agent/binder composition was 100/0.5/1.5.

Production of Electrode

The obtained electrode mixture was coated by a bar coater on an aluminum foil having a thickness of 15 μm which was a current collector and was dried in a nitrogen atmosphere at 110° C. for 30 minutes by using a thermostatic chamber to produce an electrode with one-side coating having a coating weight of the one side of 200 g/m².

Example 2

Preparation of Binder Composition

In an autoclave having a capacity of 2 L, 900 g of ion-exchanged water as a dispersion medium, 0.4 g of Metolose 90SH-100 (available from Shin-Etsu Chemical Co., Ltd.) as a cellulose-based suspending agent, 3.0 g of a 50 wt. % t-butyl peroxypivalate-HCFC-225cb solution as a polymerization initiator, 400 g of vinylidene fluoride, and 0.2 g of acrylic acid as a monomer were charged, and the temperature thereof was increased to 50° C. over 2 hours. Thereafter, while the temperature of 50° C. was maintained, 0.3 wt. % acrylic acid aqueous solution was gradually added at the rate that makes the polymerization pressure constant. A total of 2.0 g of acrylic acid was added, including the amount added initially. Polymerization was terminated at the same time when the addition of acrylic acid aqueous solution ended. The time took from the start of heating to the termination of the polymerization was 9.8 hours in total.

After the polymerization was terminated, the polymer slurry was heat-treated at 95° C. for 60 minutes. The polymer slurry was then filtered and dehydrated, washed with water, and dried at 80° C. for 20 hours to produce a binder composition. The yield of the obtained polymer was 79%, the inherent viscosity $\eta_i$ was 2.96 dL/g, and the absorbance ratio $A_R$ was 0.28.

Production of Electrode Mixture

The production method of the electrode mixture was the same as the method in Example 1.

Production of Electrode

The electrode was produced by the same method as in Example 1.

Example 3

Preparation of Binder Composition

In an autoclave having a capacity of 2 L, 900 g of ion-exchanged water as a dispersion medium, 0.4 g of Metolose 90SH-100 (available from Shin-Etsu Chemical Co., Ltd.) as a cellulose-based suspending agent, 4.0 g of a 50 wt. % t-butyl peroxypivalate-HCFC-225cb solution as a polymerization initiator, 400 g of vinylidene fluoride, and 0.2 g of acrylic acid as a monomer were charged, and the temperature thereof was increased to 50° C. over 2 hours. Thereafter, while the temperature of 50° C. was maintained, 0.3 wt. % acrylic acid aqueous solution was gradually added at the rate that makes the polymerization pressure constant. A total of 2.0 g of acrylic acid was added, including the amount added initially. Polymerization was terminated at the same time when the addition of acrylic acid aqueous solution was ended. The time took from the start of heating to the termination of the polymerization was 9.4 hours in total.

After the polymerization was terminated, the polymer slurry was heat-treated at 95° C. for 60 minutes. The polymer slurry was then filtered and dehydrated, washed with water, and dried at 80° C. for 20 hours to produce a binder composition. The yield of the obtained polymer was 79%, the inherent viscosity $\eta_i$ was 2.51 dL/g, and the absorbance ratio $A_R$ was 0.29.

Production of Electrode Mixture

The production method of the electrode mixture was the same as the method in Example 1.

Production of Electrode

The electrode was produced by the same method as in Example 1.

Example 4

Preparation of Binder Composition

The preparation of the binder composition was performed by the same method as in Example 3.

Production of Electrode Mixture

In a cup made from polyethylene, an electrode active material (lithium cobaltate, CELLSEED C-10, available from Nippon Chemical Industrial Co., Ltd.) and ketjen black (Carbon ECP, available from Lion Specialty Chemicals Co., Ltd.) as a conductive auxiliary agent were added and mixed by AR-310, available from Thinky Corporation, (1500 rpm, 1 minute). To this, the binder composition was added and mixed (1500 rpm, 2 minutes). Furthermore, NMP was added to adjust the viscosity to a viscosity that enables coating, and mixed (1500 rpm, 2 minutes) to prepare an electrode mixture (mixing B).

Note that the added amount (part) of the binder composition was 2 parts per 100 parts of the electrode active material. Furthermore, the added amount (part) of the conductive auxiliary agent was 0.5 parts per 100 parts of the electrode active material. That is, electrode active material/conductive auxiliary agent/binder composition was 100/0.5/2.

Production of Electrode

The electrode was produced by the same method as in Example 1.

Comparative Example 1

Preparation of Binder Composition

In an autoclave having a capacity of 2 L, 900 g of ion-exchanged water as a dispersion medium, 0.4 g of Metolose 90SH-100 (available from Shin-Etsu Chemical Co., Ltd.) as a cellulose-based suspending agent, 2.6 g of a 50 wt. % t-butyl peroxypivalate-HCFC-225cb solution as a polymerization initiator, 400 g of vinylidene fluoride, and 0.8 g of acrylic acid as a monomer were charged, and the temperature thereof was increased to 50° C. over 2 hours. Thereafter, while the temperature of 50° C. was maintained, 1 wt. % acrylic acid aqueous solution was gradually added at the rate that makes the polymerization pressure constant.

A total of 4.0 g of acrylic acid was added, including the amount added initially. Polymerization was terminated at the same time when the addition of acrylic acid aqueous solution ended. The time took from the start of heating to the termination of the polymerization was 14.6 hours in total.

After the polymerization was terminated, the polymer slurry was heat-treated at 95° C. for 60 minutes. The polymer slurry was then filtered and dehydrated, washed with water, and dried at 80° C. for 20 hours to produce a binder composition. The yield of the obtained polymer was 53%, the inherent viscosity $\eta_i$ was 2.59 dL/g, and the absorbance ratio $A_R$ was 0.83.

Production of Electrode Mixture

The production method of the electrode mixture was the same as the method in Example 1.

Production of Electrode

The electrode was produced by the same method as in Example 1.

Number Average Molecular Weight Ratio Mn2/Mn1

In the present examples, the number average molecular weight ratio was estimated by the following method.

First, a 0.1 wt. % binder composition-NMP solution was prepared. While 5 g of this solution was sufficiently agitated, 0.8 g of AKP 3000 (high purity alumina, available from Sumitomo Chemical Co., Ltd.) was gradually added. After the addition of the AKP 3000, agitation was performed for 2.5 hours, and then the mixture was allowed to stand still overnight. The supernatant was collected and subjected to centrifugal separation. The supernatant after the centrifugal separation and the 0.1% binder composition-NMP solution before the alumina addition were subjected to GPC analysis to calculate each of the number average molecular weights. The number average molecular weight of the vinylidene fluoride copolymer composition before being added to the alumina was used as Mn1, and the number average molecular weight of the vinylidene fluoride copolymer composition that was not adsorbed onto the alumina after being added to the alumina was used as Mn2, and the number average molecular weight ratio, which was the ratio of Mn2 to Mn1, was then determined.

GPC measurement conditions

Solvent: 10 mM LiBr-NMP solution
Column: KD-806M×2
Measurement temperature: 40° C.
Flow rate: 1 mL/min
Detector: RI detector
Injection amount: 100 μL Peel Strength The electrode with one-side coating obtained in each of Examples 1 to 4 and Comparative Example 1 was cut to the length of 100 mm and the width of 20 mm, and a 90 degree peeling test was conducted at a head speed of 10 mm/min in accordance with JIS K 6854-1 by using a tensile tester (STA-1150 Universal Testing Machine, available from Orientec Co., Ltd.) to evaluate the peel strength.

Volume Resistivity

The electrode with one-side coating obtained in each of Examples 1 to 4 and Comparative Example 1 was cut to the length of 30 mm and the width of 30 mm, and OPP tape was adhered to the coated face to peel off the aluminum foil, and this was used as a measurement sample. For the measurement, Loresta GP MCP-T610 (Mitsubishi Chemical Corporation) (probe: PSP (four-terminal method)) was used, and the volume resistivity was evaluated.

Melting Point

To determine the melting point, the vinylidene fluoride copolymer composition was heat-pressed at 230° C. to prepare a 30 mm×30 mm pressed sheet. Approximately 10 mg was cut out from the produced pressed sheet, and this was used as a measurement sample. The measurement sample was placed in a sample pan made from aluminum, and measurement was performed by using a differential scanning calorimeter (DSC) (available from Mettler Toledo). As the measurement conditions, the temperature of the measurement sample was increased to 230° C. and maintained for 10 minutes. Thereafter, the measurement sample was cooled down to 30° C. at 10 K/min and maintained for 10 minutes. Thereafter, the temperature was increased to 230° C. at 10 K/min. The peak top temperature of the greatest endothermic peak obtained at the time of the second temperature increase was used as the melting point.

In Table 1, results of the inherent viscosity, the peel strength, the volume resistivity, and the number average molecular weight ratio of each of the examples and the comparative examples are shown. Furthermore, the melting points of each of the vinylidene fluoride copolymer compositions used in Examples 1 to 3 and Comparative Example 1 are shown in Table 2.

TABLE 1

| Polymer | Inherent viscosity (dL/g) | Mixing Added amount of binder composition (part) | Mixing method | Peel strength (gf/mm) | Volume resistivity (Ω · cm) | Mn2/Mn1 |
| --- | --- | --- | --- | --- | --- | --- |
| Example 1 | 3.04 | 1.5 | A | 1.40 | 2.3 × 10$^4$ | 1.39 |
| Example 2 | 2.96 | 1.5 | A | 1.50 | 5.5 × 10$^4$ | 1.96 |
| Example 3 | 2.51 | 1.5 | A | 1.20 | 1.2 × 10$^4$ | 1.32 |
| Example 4 | 2.51 | 2 | B | 5.04 | 1.0 × 10$^5$ | 1.32 |
| Comparative Example 1 | 2.59 | 1.5 | A | 1.30 | 6.3 × 10$^5$ | 2.42 |

TABLE 2

| Polymer | Melting point (° C.) |
| --- | --- |
| Example 1 | 170 |
| Example 2 | 166 |
| Example 3 | 167 |
| Example 4 | 167 |
| Comparative Example 1 | 162 |

INDUSTRIAL APPLICABILITY

According to the present invention, a binder composition having the excellent dispersibility of a conductive auxiliary agent while sufficient adhesiveness to a metal foil is achieved can be obtained.

The invention claimed is:

1. A binder composition for binding an electrode active material to a current collector,
   the binder composition comprising a vinylidene fluoride copolymer composition;
   the vinylidene fluoride copolymer composition comprising a copolymer of vinylidene fluoride and an acrylic monomer;
   the acrylic monomer being at least one type selected from acrylic acid and methacrylic acid; and
   the vinylidene fluoride copolymer composition having a ratio Mn2/Mn1 of less than 2, wherein:

Mn1 is a number average molecular weight of the vinylidene fluoride copolymer composition, and Mn2 is a number average molecular weight of a portion of the vinylidene fluoride copolymer composition which cannot be adsorbed onto alumina when the vinylidene fluoride copolymer composition is added into alumina, and Mn2/Mn1 is determined as follows:

adding 0.8 g of the alumina having a BET specific surface area of 4.5 $m^2$/g to 5 g of an N-methyl-2-pyrrolidone solution containing the binder composition at a concentration of 0.1 wt. % while agitating the N-methyl-2-pyrrolidone solution;

allowing the N-methyl-2-pyrrolidone solution to stand still after the alumina is added;

obtaining a supernatant from the N-methyl-2-pyrrolidone solution and centrifuging the supernatant; and conducting GPC analysis of the supernatant and the N-methyl-2-pyrrolidone solution prior to the alumina addition to obtain Mn2 and Mn1, respectively.

2. The binder composition according to claim 1, wherein a melting point of the vinylidene fluoride copolymer composition is 160° C. or higher.

3. An electrode mixture comprising: the binder composition described in claim 1, an electrode active material, and a conductive auxiliary agent.

4. An electrode comprising a layer formed from the electrode mixture described in claim 3 on a current collector.

5. A non-aqueous electrolyte secondary battery comprising the electrode described in claim 4.

* * * * *